(12) United States Patent
Park et al.

(10) Patent No.: US 9,816,432 B2
(45) Date of Patent: Nov. 14, 2017

(54) ENGINE COOLING SYSTEM

(71) Applicant: Hyundai Motor Company, Seoul (KR)

(72) Inventors: Jong Il Park, Seoul (KR); Nahm Roh Joo, Yongin-si (KR); Dong Hee Han, Seoul (KR); Hyun Jun Lim, Incheon (KR); Yoon Joo Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 368 days.

(21) Appl. No.: 14/448,826

(22) Filed: Jul. 31, 2014

(65) Prior Publication Data
US 2015/0176477 A1    Jun. 25, 2015

(30) Foreign Application Priority Data
Dec. 23, 2013  (KR) .................. 10-2013-0161447

(51) Int. Cl.
  *F02B 33/44*  (2006.01)
  *F02D 23/00*  (2006.01)
  (Continued)

(52) U.S. Cl.
  CPC ............ *F02B 29/0443* (2013.01); *F01P 3/02* (2013.01); *F01P 3/12* (2013.01); *F01P 7/165* (2013.01); *F02B 37/22* (2013.01); *F02M 26/07* (2016.02); *F01P 2003/024* (2013.01); *F01P 2003/027* (2013.01); *F01P 2060/02* (2013.01); *F01P 2060/04* (2013.01); *F01P 2060/08* (2013.01);
  (Continued)

(58) Field of Classification Search
  CPC ........ F02M 26/04; F02M 26/07; F02M 26/22; F02M 29/0443; F02B 37/18–37/186; F02B 37/16–37/162; F01P 3/02

USPC ......... 60/605.2, 605.3, 611, 602; 123/568.11
  See application file for complete search history.

(56) References Cited

U.S. PATENT DOCUMENTS

| | | | |
|---|---|---|---|
| 6,513,328 B2 * | 2/2003 | Baeuerle | F02B 37/18 60/605.1 |
| 8,424,303 B2 * | 4/2013 | Kardos | F02M 26/24 60/605.2 |

(Continued)

FOREIGN PATENT DOCUMENTS

| | | |
|---|---|---|
| JP | 2002-349261 A | 12/2002 |
| JP | 2004-353589 A | 12/2004 |

(Continued)

*Primary Examiner* — Ngoc T Nguyen
(74) *Attorney, Agent, or Firm* — Morgan Lewis & Bockius LLP

(57) ABSTRACT

An engine cooling system may include a main intake line for supplying external air to an intake manifold attached to an engine including a cylinder block and a cylinder head, a supplementary intake line branched from one side of the main intake line and joined to the other side of the main intake line, an intake route control valve in the main intake line, a main exhaust line for flowing exhaust gas from an exhaust manifold, an exhaust route control valve in the main exhaust line, a turbocharger, an intercooler mounted to the supplementary intake line on a downstream side of the turbocharger, an EGR cooler branched from the exhaust manifold for recirculating the exhaust gas and provided in an EGR line connected to the main intake line; and a cooling line for flowing a coolant supplied from a water pump to cool the EGR cooler, the exhaust route control valve and/or the turbine housing of the turbocharger.

15 Claims, 4 Drawing Sheets

(51) Int. Cl.
  *F02B 29/04* (2006.01)
  *F01P 3/02* (2006.01)
  *F01P 3/12* (2006.01)
  *F02B 37/22* (2006.01)
  *F01P 7/16* (2006.01)
  *F02M 26/07* (2016.01)
  *F02M 26/28* (2016.01)

(52) U.S. Cl.
  CPC .......... *F01P 2060/12* (2013.01); *F02M 26/28* (2016.02); *Y02T 10/146* (2013.01)

(56) References Cited

U.S. PATENT DOCUMENTS

| | | | | |
|---|---|---|---|---|
| 8,490,392 | B2 * | 7/2013 | Kardos | F02M 26/08 60/605.2 |
| 8,590,494 | B2 * | 11/2013 | Kardos | F02M 26/24 60/605.2 |
| 9,322,362 | B2 * | 4/2016 | Lim | F02M 26/08 60/605.2 |
| 2011/0210125 | A1 * | 9/2011 | Kardos | F01P 11/029 220/502 |
| 2012/0067306 | A1 * | 3/2012 | Mehring | F01D 25/14 123/41.72 |
| 2012/0201655 | A1 * | 8/2012 | Kusakabe | F02B 37/183 415/116 |
| 2013/0068202 | A1 * | 3/2013 | Kardos | F02G 5/04 123/563 |
| 2015/0047340 | A1 * | 2/2015 | Ulrey | F02B 47/08 60/600 |

FOREIGN PATENT DOCUMENTS

| | | |
|---|---|---|
| JP | 2007-56842 A | 3/2007 |
| JP | 2008-019711 A | 1/2008 |
| JP | 2008-267257 A | 11/2008 |
| KR | 10-2001-0048662 A | 6/2001 |
| WO | WO 2014017189 A1 * 1/2014 ......... F02D 41/0062 |

\* cited by examiner

ENGINE COOLING SYSTEM

CROSS-REFERENCE TO RELATED APPLICATION

The present application claims priority of Korean Patent Application Number 10-2013-0161447 filed on Dec. 23, 2013, the entire contents of which application are incorporated herein for all purposes by this reference.

BACKGROUND OF INVENTION

Field of Invention

The present invention relates to an engine cooling system. More particularly, the present invention relates to an engine cooling system for effectively cooling parts of an engine system in which exhaust gas is recirculated by using a turbocharger for improving output in a low speed range.

Description of Related Art

In general, it is known that a diesel engine has lower fuel consumption and better efficiency than a gasoline engine. In general, the diesel engine displays efficiency in a range of 40% owing to a high compression ratio of the diesel engine.

Currently, in order to obtain a high output from the engine, the engine is additionally provided with a turbocharger and an intercooler. The engine having the turbocharger applied thereto takes in exhaust gas or external air through a compressor in the turbocharger and supplies supercharged air (high temperature compressed air) produced thereby to an engine side.

However, the compressed air rapidly absorbs heat from the turbocharger and heat generated in a course of the compression, resulting in lower density and thus poor charging efficiency. Therefore, the supercharged air is cooled by using the intercooler to obtain high density air, resulting in intake of much air into an engine combustion chamber, enabling high output.

In the meantime, in order to meet the current exhaust gas control trend, such as EURO 3 or EURO 4 in Europe, a variety of systems have been suggested in which a portion of the exhaust gas containing CO, HC, $NO_x$, and so on being exhausted from a turbo diesel engine is re-circulated for further reducing contents thereof. Of the systems, typical one is an EGR system (exhaust gas recirculation system).

Along with this, research is underway in which an output torque is increased while reducing the fuel consumption in medium to low speed ranges of engine RPM in the engine having the turbocharger, and research is also underway for making efficient control of the supply of the recirculated gas.

Along with these researches, research is also underway for efficiently cooling an engine system having a turbocharger, an intercooler, and an EGR system.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an engine system for efficiently cooling a turbocharger, an intercooler, and an EGR system. Further, the present invention has been made in an effort to provide an engine system for reducing a manufacturing cost by simplifying a cooling path.

An engine cooling system according to various aspects of the present invention includes: a main intake line for supplying external air to an intake manifold attached to an engine including a cylinder block and a cylinder head; a supplementary intake line branched from one side of the main intake line and joined to the other side of the main intake line; an intake route control valve provided in the main intake line; a main exhaust line for flowing exhaust gas from an exhaust manifold provided in the cylinder block; an exhaust route control valve provided in the main exhaust line; a turbocharger including a turbine housing and a turbine wheel to be rotated by the exhaust gas flowing in the supplementary exhaust line, a compressor housing and a compressor wheel to be rotated by rotation force of the turbine wheel and supercharging intake air flowing in the supplementary intake line, a shaft connecting the turbine wheel and the compressor wheel, and a bearing for rotatably supporting the shaft; an intercooler mounted to the supplementary intake line on a downstream side of the turbocharger; an exhaust gas recirculation (EGR) cooler branched from the exhaust manifold for recirculating the exhaust gas and provided in an EGR line connected to the main intake line; and a cooling line for flowing a coolant supplied from a water pump to cool the EGR cooler, the exhaust route control valve, and the turbine housing.

The coolant supplied from the water pump may pass through the cylinder head, and the coolant passed through the cylinder head may be supplied to the cooling line.

The coolant supplied to the cooling line may be supplied to the EGR cooler, and the coolant passed through the EGR cooler may be supplied to the exhaust route control valve or the turbine housing. The coolant supplied to the cooling line may be supplied to the EGR cooler, and the coolant passed through the EGR cooler may be supplied to the exhaust route control valve and the turbine housing. The coolant supplied to the cooling line may be supplied to the EGR cooler, the exhaust route control valve, and the turbine housing.

The engine cooling system may further include: a cooling bypass line through which the coolant flowed into the EGR cooler is circulated through the cylinder head; and a cooling valve provided in the cooling line through which the coolant passed through the exhaust route control valve or the turbine housing is exhausted to the cylinder head.

The coolant supplied from the water pump may be supplied directly to the cooling line.

The coolant supplied to the cooling line may be supplied to the EGR cooler, and the coolant passed through the EGR cooler may be supplied to the exhaust route control valve or the turbine housing. The coolant supplied to the cooling line may be supplied to the EGR cooler, and the coolant passed thought the EGR cooler may be supplied to the exhaust route control valve and the turbine housing. The coolant supplied to the cooling line may be supplied to the EGR cooler, the exhaust route control valve, and the turbine housing.

The engine cooling system may further include: a cooling bypass line through which the coolant flowed into the EGR cooler is circulated through the cylinder head; and a cooling valve provided in the cooling line through which the coolant passed through the exhaust route control valve or the turbine housing is exhausted to the cylinder head.

The coolant supplied from the water pump passes through the cylinder block and the cylinder head and flows into a thermostat housing, and the coolant passed through the thermostat housing is supplied to the cooling line.

The coolant supplied to the cooling line may be supplied to the EGR cooler, and the coolant passed through the EGR cooler may be supplied to the exhaust route control valve, the turbine housing, or the shaft and the bearing of the turbocharger. The coolant supplied to the cooling line may be supplied to the EGR cooler, and the coolant passed through the EGR cooler may be supplied to the exhaust route control valve and the turbine housing or the shaft and the bearing of the turbocharger. The coolant supplied to the cooling line may be supplied to the EGR cooler, the exhaust route control valve, and the turbine housing, the shaft, and the bearing of the turbocharger.

The engine cooling system may further include: a cooling bypass line through which the coolant flowed into the EGR cooler is circulated through the cylinder head; and a cooling valve provided in the cooling line through which the coolant passed through the exhaust route control valve or the turbine housing is exhausted to the cylinder head.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The drawings are provided for reference in describing exemplary embodiments of the present invention, and the spirit of the present invention should not be construed only by the accompanying drawings.

DETAILED DESCRIPTION

Figure 1:
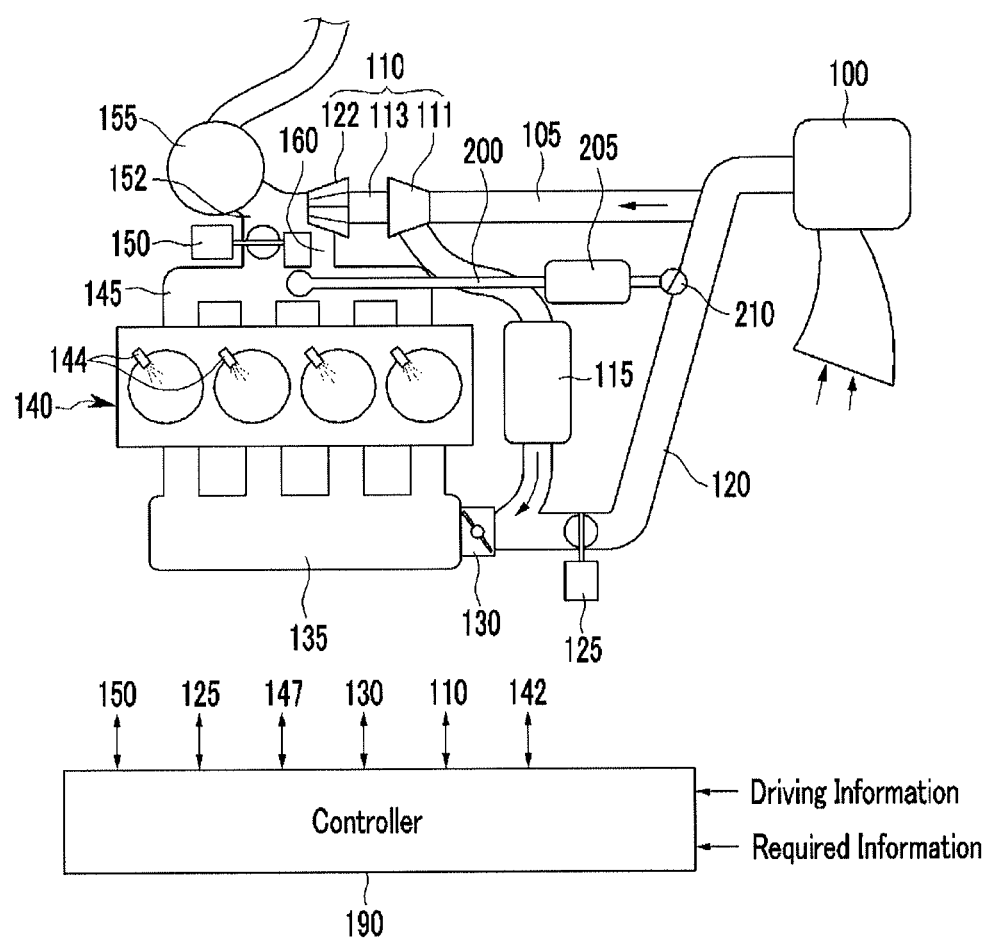
FIG. 1 is a schematic diagram illustrating an exemplary engine system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In order to clearly describe the present invention, portions that are not connected with the description will be omitted. Like reference numerals designate like elements throughout the specification In addition, the size and thickness of each configuration shown in the drawings are shown for better understanding and ease of description, but the present invention is not limited thereto. In the drawings, the thickness of layers, films, panels, regions, etc., are drawn for clarity.

FIG. 1 is a schematic diagram illustrating an engine system according to various embodiments of the present invention. As shown in FIG. 1, an engine system according to various embodiments of the present invention includes an air cleaner box 100, a supplementary intake line 105, a main intake line 120, an intercooler 115, an intake route control valve 125, a throttle body 130, an intake manifold 135, an engine 140, an injector 144, an exhaust manifold 145, a supplementary exhaust line 160, a main exhaust line 152, an exhaust route control valve 150, a small turbocharger 110, a catalyst 155, and a controller 190.

The controller 190 calculates a required torque upon reception of operation conditions, such as an engine speed, and required operation signals, such as accelerator pedal signal, and controls controllable constituent elements and a fuel spray amount of the injector 144.

The controller 190 controls the intake route control valve 125 and the exhaust route control valve 150 to control a re-circulation rate of the exhaust gas. Since the engine control with the control unit 190 is known, a detailed description thereof will be omitted.

The turbocharger 110 includes a turbine housing 112 providing a turbine wheel being rotated by exhaust gas flowing in the supplementary exhaust line, and a compressor housing 111 providing a compressor wheel being rotated by rotation force of the turbine wheel and supercharging intake air flowing in the supplementary intake line.

The turbine wheel and the compressor wheel are connected by a shaft, and a bearing is provided for rotatably supporting the shaft. In the turbocharger, high-temperature heat is generated by high speed rotation of the shaft, and the shaft and the bearing are cooled by a coolant.

The main exhaust line 152 is branched from the exhaust manifold 145, and has the exhaust route control valve 150 mounted thereto. The supplementary exhaust line 160 is branched from the exhaust manifold 145 and joins with the main exhaust line 152. The catalyst 155 is mounted to a downstream side of a point where the supplementary exhaust line 160 and the main exhaust line 152 join together.

If the exhaust route control valve 150 is closed, the exhaust gas passes through the turbine of the turbocharger 110 through the supplementary exhaust line 160. If the exhaust route control valve 150 is fully opened, since most of the exhaust gas exhausts through the main exhaust line 152, the turbocharger 110 virtually does not operate.

The air cleaner box 100, the turbocharger compressor wheel, the intercooler 115, and the throttle body 130 are mounted to the supplementary intake line 105.

The supplementary intake line 105 is branched from the main intake line 120, passes the turbocharger 110 and the intercooler 115, and joins the main intake line 120 on a downstream side of the intercooler 115. The intake route control valve 125 is mounted to the main intake line 120.

In some embodiments of the present invention, the turbocharger 110 has a small size, of which an air flow coefficient is below 2 with reference to an air flow rate passing through the compressor wheel mounted to an intake side. The air flow coefficient may be defined as follows:

The air flow coefficient=a highest air flow rate (kg/h) passing through the compressor/an exhaust rate (L)/100

An EGR line 200 is branched from the exhaust manifold 145 and joins the main intake line 120. Also, the EGR line 200 has an EGR cooler 205 disposed thereon, and an EGR valve 210 is disposed to a joining point of the EGR line 200 and the main intake line 120.

Therefore, the exhaust gas supplied from the exhaust manifold 145 to the EGR line 200 is supplied to the main intake line 120 through the EGR cooler 205 and the EGR valve 210. A flow rate of recirculating exhaust gas may be controlled with the EGR valve 210 and the exhaust gas bypass valve 150.

Figure 2:
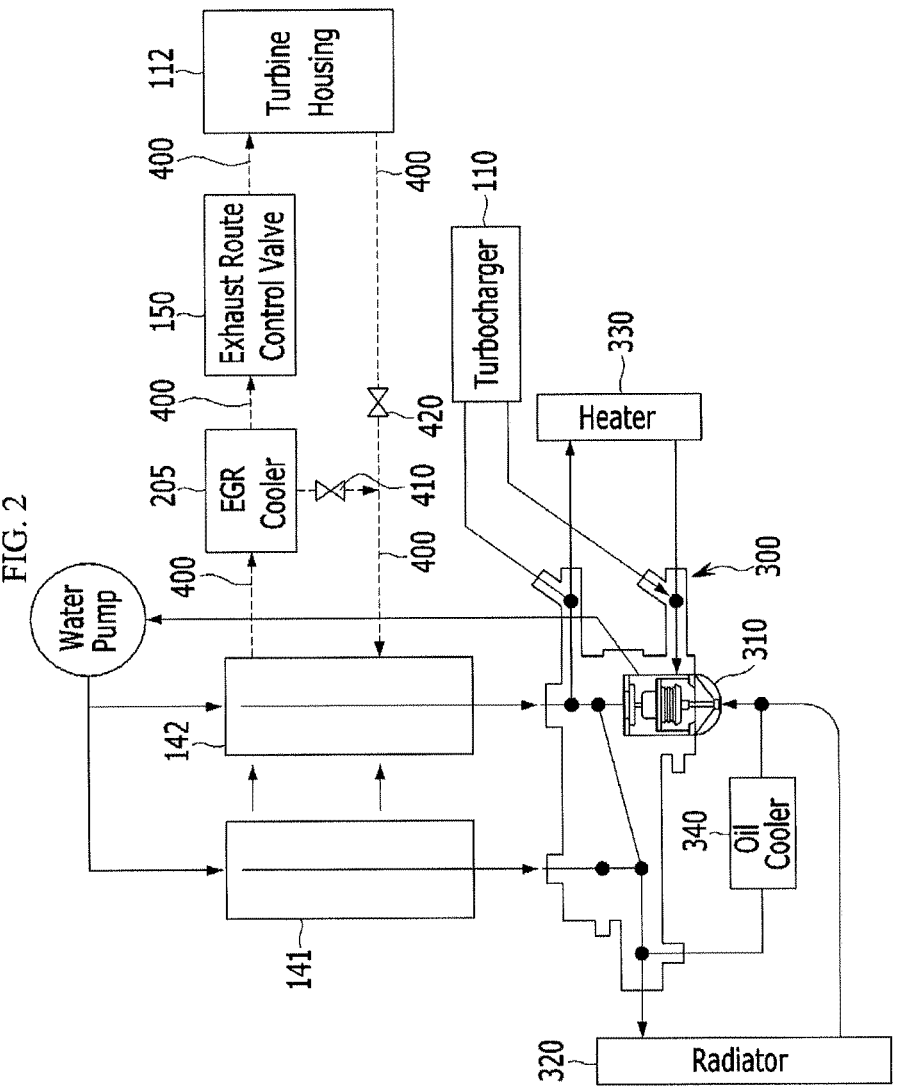
FIG. 2 is a schematic diagram illustrating an exemplary engine cooling system according to the present invention.

FIG. 2 is a schematic diagram illustrating an engine cooling system according to various embodiments of the present invention. As shown in FIG. 2, a coolant supplied from the water pump is supplied to the cylinder block and the cylinder head 142 of the engine 140. A part of the coolant flowed into the cylinder head 142 is supplied to a cooling line 400 for cooling the EGR cooler 205, the exhaust route control valve 150, and the turbine housing 112.

The coolant passing through the cylinder block and the cylinder head 142 flows into a thermostat housing 300, and is cooled by passing through a radiator. The cooled coolant again flows into the thermostat housing 300 and is supplied to the water pump.

A part of the coolant flowed into the thermostat housing 300 is supplied to a heater, and after cooling the heater the coolant flows into the thermostat housing 300. A part of the coolant flowed into the thermostat housing 300 is supplied to the turbocharger 110 in order to cool the shaft and the bearing, and after cooling the turbocharger 110 the coolant flows into the thermostat housing 300 again.

The coolant flowed into the cooling line 400 from the cylinder head 142 is supplied to the EGR cooler 205, and the coolant passing through the EGR cooler 205 is supplied to the exhaust route control valve 150 or the turbine housing 112. That is, the cooling line 400 may be formed in a sequential order of the water pump-cylinder head 142-EGR cooler 205-exhaust route control valve 150-turbine housing 112-cylinder head 142, or water pump-cylinder head 142-EGR cooler 205-turbine housing 112-exhaust route control valve 150-cylinder head 142.

Meanwhile, a cooling bypass line 410 is further provided so that the coolant flowed into the EGR cooler 205 circulates through the cylinder head 142, and a cooling valve 420 is provided downstream of the cooling line 400 so that the coolant passing through the exhaust route control valve 150 or the turbine housing 112 circulates through the cylinder head 142.

Since the bypass line and the cooling valve 420 are provided, the coolant flowed from the cylinder head 142 can cool only the EGR cooler 205.

Generally, in an initial time of cold starting of a vehicle, an exhaust gas temperature is temporally increased to activate the catalyst through increment of a catalyst temperature. After activation of the catalyst, the exhaust gas temperature is decreased.

Therefore, when the vehicle cold starts before activation of the catalyst, the EGR cooler 205 is cooled only by closing the cooling valve 420. Thus, thermal load by the cooling line 400 is decreased such that rapid increment of an engine coolant can be prevented. Further, since heat transfer to the cooling line 400 by exhaust gas is decreased, temperature loss of the exhaust gas can be minimized. Therefore, activation time of the catalyst by the temperature loss of the exhaust gas is reduced and thus purification of exhaust gas is improved.

After activation of the catalyst, the coolant flows into the cooling line 400 by opening the cooling valve 420, and the coolant flowed into the cooling line 400 makes the heated coolant remaining in the cooling line 400 during activation of the catalyst flow. Thus, fuel consumption is reduced.

Alternatively, the coolant flowed into the cooling line 400 from the cylinder head 142 may be supplied to the EGR cooler 205, and the coolant passing through the EGR cooler 205 is supplied to each of the exhaust route control valve 150 and the turbine housing 112. That is, the cooling line 400 may be formed in a sequential order of the water pump-cylinder head 142-EGR cooler 205-exhaust route control valve 150/turbine housing 112-cylinder head 142.

Alternatively, the coolant flowed into the cooling line 400 from the cylinder head 142 may be supplied to each of the EGR cooler 205 and the exhaust route control valve 150 and the turbine housing 112. That is, the cooling line 400 may be formed as a sequential order of the water pump-cylinder head 142-EGR cooler 205/exhaust route control valve 150/turbine housing 112-cylinder head 142.

Considering engine performance and fuel consumption, it is required that an exit temperature of the EGR cooler 205 is controlled to be as low as possible. Thus, the EGR cooler 205 is disposed in the cooling line 400 so that the EGR cooler 205 is cooled the most preferentially.

Figure 3:
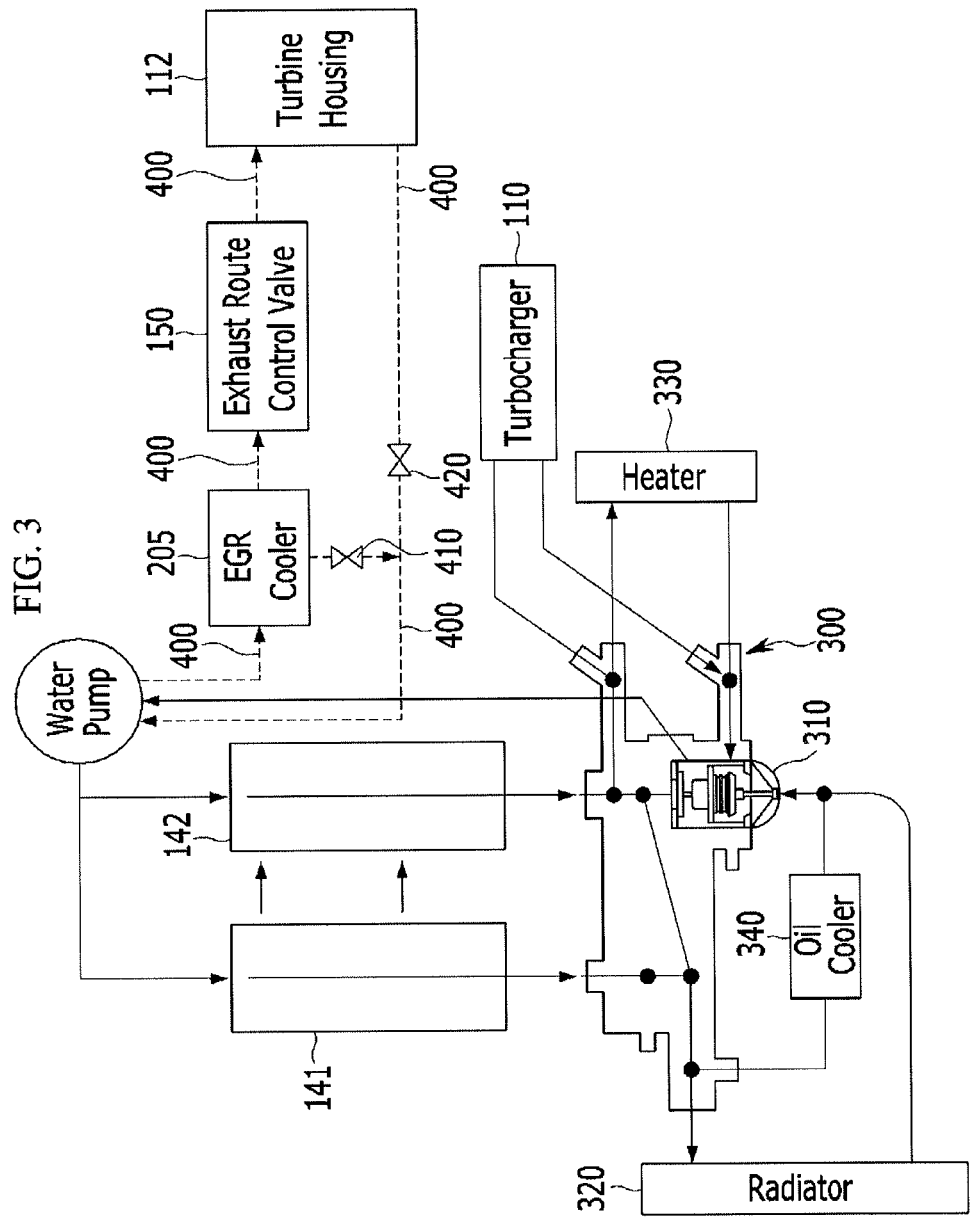
FIG. 3 is a schematic diagram illustrating another exemplary engine cooling system according to the present invention.

Hereinafter, an engine cooling system according to another exemplary embodiment of the present invention will be described. FIG. 3 is a schematic diagram illustrating an engine cooling system according to another exemplary embodiment of the present invention. Some features of the engine cooling system according to the current exemplary embodiment of the present invention are basically the same as those in the configuration of FIG. 2, and differences from FIG. 2 will be described.

As shown in FIG. 3, an engine cooling system according to the current exemplary embodiment of the present invention directly supplies a coolant from the water pump to the cooling line 400.

The coolant supplied to the cooling line 400 is supplied to the EGR cooler 205, and the coolant passing through the EGR cooler 205 is supplied to the exhaust route control valve 150 or the turbine housing 112. That is, the cooling line 400 may be formed in a sequential order of the water pump-EGR cooler 205-exhaust route control valve 150-turbine housing 112-water pump, or the cooling line 400 may be formed in a sequential order of the water pump-EGR cooler 205-turbine housing 112-exhaust route control valve 150-water pump.

Alternatively, the coolant flowed into the cooling line 400 is supplied to the EGR cooler 205, and the coolant passing through the EGR cooler 205 is supplied to the exhaust route control valve 150 and the turbine housing 112. That is, the cooling line 400 may be formed in a sequential order of the water pump-EGR cooler 205-exhaust route control valve 150/turbine housing 112-water pump.

As a further alternative, the coolant flowed into the cooling line 400 is supplied to the EGR cooler 205, the exhaust route control valve 150, and the turbine housing 112. That is, the cooling line 400 may be formed in a sequential order of the water pump-EGR cooler 205/exhaust route control valve 150/turbine housing 112-water pump.

Considering engine performance and fuel consumption, it is required that an exit temperature of the EGR cooler 205 is controlled to be as low as possible. Thus, the EGR cooler 205 is disposed in the cooling line 400 so that the EGR cooler 205 is cooled the most preferentially.

Figure 4:
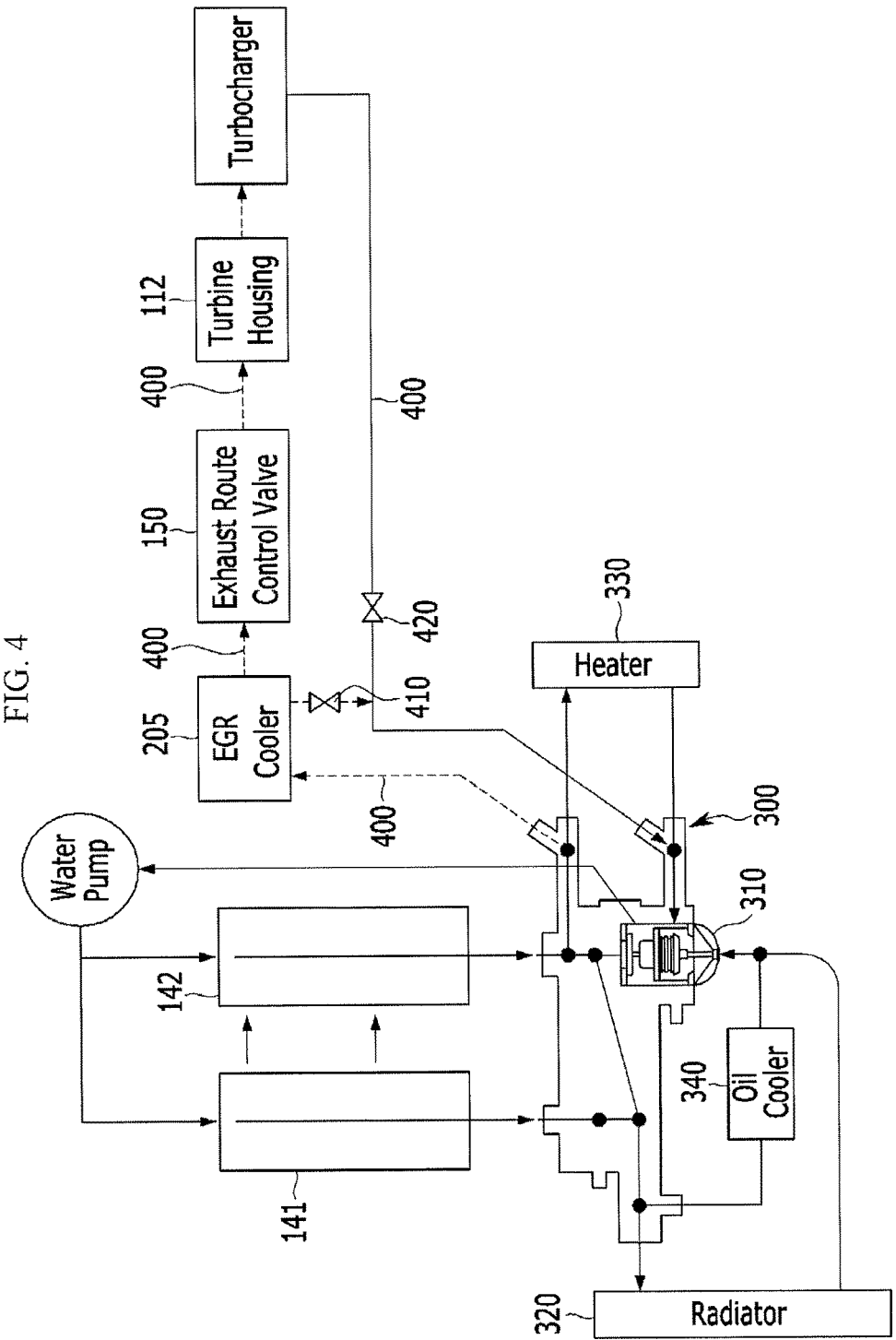
FIG. 4 is a schematic diagram illustrating still another exemplary engine cooling system according to the present invention.

Hereinafter, an engine cooling system according to another exemplary embodiment of the present invention will now be described in detail. FIG. 4 is a schematic diagram an engine cooling system according to another exemplary embodiment of the present invention. Some features of the engine cooling system according to the current exemplary embodiment of the present invention are basically the same as those in the configuration of FIG. 2, and differences from FIG. 2 will be described.

As shown in FIG. 4, in an engine cooling system according to the current exemplary embodiment of the present invention, the coolant supplied from the water pump passes through the cylinder block 141 and the cylinder head 142 and flows in the thermostat housing, and the coolant passing through the thermostat housing is supplied to the cooling line 400.

The coolant supplied to the cooling line 400 is supplied to the EGR cooler 205, and the coolant passing through the EGR cooler 205 is supplied to the exhaust route control valve 150, the turbine housing 112, or the turbocharger 110. That is, the cooling line 400 may be formed in a sequential order of the water pump-thermostat housing-EGR cooler 205-exhaust route control valve 150-turbine housing 112-turbocharger 110-thermostat housing; the cooling line 400 may be formed in a sequential order of the water pump-thermostat housing-EGR cooler 205-exhaust route control valve 150-turbocharger 110-turbine housing 112-thermostat housing; the cooling line 400 may be formed in a sequential order of the water pump-thermostat housing-EGR cooler 205-turbine housing 112-exhaust route control valve 150-turbocharger 110-thermostat housing; the cooling line 400 may be formed in a sequential order of the water pump-thermostat housing-EGR cooler 205-turbine housing 112-turbocharger 110-exhaust route control valve 150-thermostat housing; the cooling line 400 may be formed in a sequential order of the water pump-thermostat housing-EGR cooler 205-turbocharger 110-turbine housing 112-exhaust route control valve 150-thermostat housing; or the cooling line 400 may be formed in a sequential order of the water pump-thermostat housing-EGR cooler 205-turbocharger 110-exhaust route control valve 150-turbine housing 112-thermostat housing.

Alternatively, the coolant supplied to the cooling line 400 is supplied to the EGR cooler 205, and the coolant passing through the EGR cooler 205 is supplied to the exhaust route control valve 150, and the turbine housing 112 or the turbocharger 110. That is, the cooling line 400 may be formed in a sequential order of the water pump-EGR cooler 205-exhaust route control valve 150/turbine housing 112/turbocharger 110-thermostat housing.

Alternatively, the coolant supplied to the cooling line 400 is supplied to the EGR cooler 205, the exhaust route control valve 150, the turbine housing 112, and the turbocharger 110. That is, the cooling line 400 may be formed in a sequential order of the water pump-EGR cooler 205/exhaust route control valve 150/turbine housing 112/turbocharger 110-thermostat housing.

Considering engine performance and fuel consumption, it is required that an exit temperature of the EGR cooler 205 is controlled to be as low as possible. Thus, the EGR cooler 205 is disposed in the cooling line 400 so that the EGR cooler 205 is cooled the most preferentially.

As described above, technical features of the present invention include that a cooling line 400 is formed for flowing the coolant supplied from the water pump in order to cool the EGR cooler 205, the exhaust route control valve 150, and the turbine housing 112. Through the above or similar construction, the EGR cooler 205, the exhaust route control valve 150, and the turbine housing 112 can be cooled en bloc, and thus the cooling line 400 is simplified and manufacturing cost is reduced.

That is, since the EGR cooler 205, the exhaust route control valve 150, and the turbine housing 112 are water-cooled, the turbine housing 112 can be manufactured with a low-cost material such as aluminum and thus the manufacturing cost is reduced.

Further, since a bypass line passing through the EGR cooler 205 and the cooling valve 420 are further provided, activation time of the catalyst during cold starting can be reduced and fuel consumption is improved.

Further, as described above, since the cooling line 400 is formed as various types, the engine cooling system according to the present invention can adopt various constructions according to variation of design.

Further, the cooling line 400 according to various embodiments of the present invention is formed such that the EGR cooler 205 is cooled first. Considering engine performance and fuel consumption, it is required that an exit temperature of the EGR cooler 205 is controlled to be as low as possible. Thus, when the cooling line 400 is formed, the EGR cooler 205 is disposed in the cooling line 400 so that the EGR cooler 205 is cooled the most preferentially.

According to the present invention, since a cooling line is formed to cool an exhaust route control valve, a turbine housing, and an EGR cooler, the cooling path is simplified and the manufacturing cost is reduced.

Further, since a control valve is provided in the cooling line, an increment time of a coolant temperature increase after activation of a catalyst is reduced and cold fuel consumption is improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine cooling system comprising:
a main intake line for supplying external air to an intake manifold attached to an engine comprising a cylinder block and a cylinder head;
a supplementary intake line branched from one side of the main intake line and joined to the other side of the main intake line;
an intake route control valve provided in the main intake line; a main exhaust line for flowing exhaust gas from an exhaust manifold provided in the cylinder block; an exhaust route control valve provided in the main exhaust line;
a turbocharger including:
a turbine housing and a turbine wheel to be rotated by the exhaust gas flowing in a supplementary exhaust line,
a compressor housing and a compressor wheel to be rotated by rotation force of the turbine wheel, the compressor wheel supercharging intake air flowing in the supplementary intake line,
a shaft connecting the turbine wheel and the compressor wheel, and
a bearing for rotatably supporting the shaft;
an intercooler mounted to the supplementary intake line on a downstream side of the compressor housing of the turbocharger in an intake side of the turbocharger;
an exhaust gas recirculation (EGR) cooler branched from the exhaust manifold and provided in an EGR line connected to the main intake line; and a cooling line for flowing a coolant supplied from a water pump to cool the EGR cooler, the exhaust route control valve, and/or the turbine housing, wherein the coolant supplied from the water pump passes through the cylinder head, and the coolant passed through the cylinder head is supplied to the cooling line, and wherein the coolant supplied to the cooling line is supplied to the EGR cooler, the exhaust route control valve, and the turbine housing.

2. The engine cooling system of claim 1, wherein the coolant supplied to the cooling line is supplied to the EGR cooler, and the coolant passed through the EGR cooler is supplied to the exhaust route control valve and/or the turbine housing.

3. The engine cooling system of claim 2, further comprising:
a cooling bypass line through which the coolant flowed into the EGR cooler is circulated through the cylinder head bypassing the exhaust route control valve and/or the turbine housing; and
a cooling valve provided in the cooling line through which the coolant passed through the exhaust route control valve and/or the turbine housing is exhausted to the cylinder head.

4. The engine cooling system of claim 1, further comprising:
a cooling bypass line through which the coolant flowed into the EGR cooler is circulated through the cylinder head bypassing the exhaust route control valve and/or the turbine housing; and
a cooling valve provided in the cooling line through which the coolant passed through the exhaust route control valve and the turbine housing is exhausted to the cylinder head.

5. The engine cooling system of claim 1, wherein the coolant supplied from the water pump is supplied directly to the cooling line.

6. The engine cooling system of claim 5, wherein the coolant supplied to the cooling line is supplied to the EGR cooler, and the coolant passed through the EGR cooler is supplied to the exhaust route control valve and/or the turbine housing.

7. The engine cooling system of claim 6, further comprising:
a cooling bypass line through which the coolant flowed into the EGR cooler is circulated through the cylinder head bypassing the exhaust route control valve and/or the turbine housing; and
a cooling valve provided in the cooling line through which the coolant passed through the exhaust route control valve and/or the turbine housing is exhausted to the cylinder head.

8. The engine cooling system of claim 5, further comprising:
a cooling bypass line through which the coolant flowed into the EGR cooler is circulated through the cylinder head bypassing the exhaust route control valve and/or the turbine housing; and
a cooling valve provided in the cooling line through which the coolant passed through the exhaust route control valve and the turbine housing is exhausted to the cylinder head.

9. The engine cooling system of claim 1, wherein the coolant supplied from the water pump passes through the cylinder block and the cylinder head and flows into a thermostat housing, and the coolant passed through the thermostat housing is supplied to the cooling line.

10. The engine cooling system of claim 9, wherein the coolant supplied to the cooling line is supplied to the EGR cooler, and the coolant passed through the EGR cooler is supplied to the exhaust route control valve, the turbine housing, or the shaft and the bearing of the turbocharger.

11. The engine cooling system of claim 10, further comprising:
a cooling bypass line through which the coolant flowed into the EGR cooler is circulated through the cylinder head bypassing the exhaust route control valve and/or the turbine housing; and
a cooling valve provided in the cooling line through which the coolant passed through the exhaust route control valve or the turbine housing is exhausted to the cylinder head.

12. The engine cooling, system of claim 9, wherein the coolant supplied to the cooling line is supplied to the EGR cooler, and the coolant passed through the EGR cooler is supplied to the exhaust route control valve and the turbine housing or the shaft and the bearing of the turbocharger.

13. The engine cooling system of claim 12, further comprising:
a cooling bypass line through which the coolant flowed into the EGR cooler is circulated through the cylinder head bypassing the exhaust route control valve and/or the turbine housing; and
a cooling valve provided in the cooling line through which the coolant passed through the exhaust route control valve and the turbine housing is exhausted to the cylinder head.

14. The engine cooling system of claim 9, wherein the coolant supplied to the cooling line is supplied to the EGR cooler, the exhaust route control valve, and the turbine housing, the shaft, and the bearing of the turbocharger.

15. The engine cooling system of claim 14, further comprising:
a cooling bypass line through which the coolant flowed into the EGR cooler is circulated through the cylinder head bypassing the exhaust route control valve and/or the turbine housing; and
a cooling valve provided in the cooling line through which the coolant passed through the exhaust route control valve and the turbine housing is exhausted to the cylinder head.

* * * * *